United States Patent

Earp

[15] 3,654,491

[45] Apr. 4, 1972

[54] CHIRP PULSE GENERATING CIRCUITS

[72] Inventor: Ronald Lee Earp, Burlington, N.C.

[73] Assignee: Bell Telephone Laboratories, Incorporated, Murray Hill, N.J.

[22] Filed: Mar. 12, 1970

[21] Appl. No.: 18,888

[52] U.S. Cl. ..............................307/262, 307/246, 307/259, 307/293, 328/13, 328/67, 333/29, 333/70 T

[51] Int. Cl. .....................H03k 3/53, H03k 3/80, H03h 7/32

[58] Field of Search .................333/70, 70 T, 29, 20; 328/13, 328/14, 34, 56, 59–63, 65–67, 50–51; 331/151, 172–173; 307/262, 259, 238–243, 246, 261, 293; 332/1, 2, 9, 16; 325/126, 131; 179/1, 1 J

[56] References Cited

UNITED STATES PATENTS

| | | | |
|---|---|---|---|
| 2,596,142 | 5/1952 | Gerwin | 328/66 X |
| 2,923,891 | 2/1960 | Nicholson, Jr. | 332/16 |

*Primary Examiner*—Herman Karl Saalbach
*Assistant Examiner*—Marvin Nussbaum
*Attorney*—R. J. Guenther and William L. Keefauver

[57] ABSTRACT

Chirp pulse generating circuits using constant-K, incrementally time dispersive delay lines are disclosed. Gated sources place predetermined amounts of energy in elements of the lines. When this energy discharges, Chirp pulse output signals are produced.

18 Claims, 6 Drawing Figures

INVENTOR
R. L. EARP
BY
H. L. Logan
ATTORNEY

CHIRP PULSE GENERATING CIRCUITS

GOVERNMENT CONTRACT

The invention herein claimed was made in the course of or under a contract with the Department of the Army.

BACKGROUND OF THE INVENTION

1. Field of the Invention

This invention relates to pulse generators which produce bursts of frequency modulated waves. Such generators are frequently referred to as Chirp pulse generators.

2. Description of the Prior Art

In pulse communication systems, the energy of each transmitted pulse of waves must be sufficient so that it is detectable when received. At the same time, the bandwidth of each transmitted pulse must be sufficient to convey the desired information. These requirements, however, are related to the length of the transmitted pulse in an opposite sense as the longer the pulse the greater the energy content but the smaller the bandwidth. This has frequently required system compromises such as range and resolution compromises in radar systems.

With the above problem in mind, a new technique using pulses of frequency modulated, or so-called "Chirp", signals was conceived. This technique is thoroughly described in U.S. Pat. No. 2,678,997 issued to S. Darlington on May 18, 1954 and also in the article entitled "The Theory and Design of Chirp Radars", by J. R. Klaudner, et al., in the July 1960 issue of *The Bell System Technical Journal*. In brief, relatively long bursts of frequency modulated waves are transmitted with the received portions thereof being passed through networks which introduce time delays as a function of frequency to produce shorter duration pulses. Transmitted energy is thereby increased by increasing the pulse duration while bandwidth is maintained by using frequency modulated waves and frequency responsive compression networks.

Systems employing Chirp signals must of course have generators for generating the signals. Although the prior art discloses a number of these generators, many of them have been found to present problems from one or more of the following standpoints: cost, reliability, stability, recovery time, shape of output waveforms, isolation between trigger pulses and output waves and/or sensitivity to shape of trigger pulses.

SUMMARY OF THE INVENTION

An object of the present invention is to generate Chirp signals with apparatus having good characteristics from all of the above-listed standpoints.

This and other objects are achieved in accordance with the invention by periodically charging elements of an incrementally time dispersive delay line to predetermined energy levels. When these elements discharge between charging periods, a frequency modulated or Chirped output wavetrain is produced.

One embodiment of the invention comprises a constant-K, low-pass filter-type delay line formed from discrete capacitors and inductors. When viewed from its input port to its output port, this line has a substantially constant impedance characteristic but a uniformly decreasing time delay characteristic. The embodiment further comprises an impedance matching terminating resistor and an impedance matching load connected to the input and output ports of the line, respectively. Still further, the embodiment includes a gated voltage source which is enabled in response to a trigger pulse to place predetermined charges of energy in the line capacitors. When the source is again disabled, the energy in the capacitors discharges with the inductors and capacitors of the line cooperating to apply a substantially constant amplitude Chirp signal to the load.

Another embodiment of the invention uses a delay line substantially identical to the one in the previously described embodiment. In this embodiment, however, a very large valued capacitor, which does not affect the above-described characteristics of the line within the passband required for the Chirp burst, is placed in series with each line inductor. The inductors are thus isolated in a direct current sense from one another while the line still has the previously described characteristics over its operating passband. A gated current source is connected to the inductors so that when enabled, predetermined currents build up in the inductors to charge the inductors. When the source is again disabled, the energy thus stored is discharged to produce a Chirp pulse output.

The invention provides several features. Embodiments may be constructed, for example, using simple inexpensive passive elements, which result in relatively high degrees of stability and reliability. Furthermore, the configurations of such embodiments provide excellent input-output isolation, low sensitivity to trigger pulse shapes, fast recovery times and an excellent degree of freedom in shaping the Chirp output.

These and other objects and features of the invention will become apparent from a study of the following detailed description of two embodiments.

DESCRIPTIONS OF THE DISCLOSED EMBODIMENTS

Figure 1:
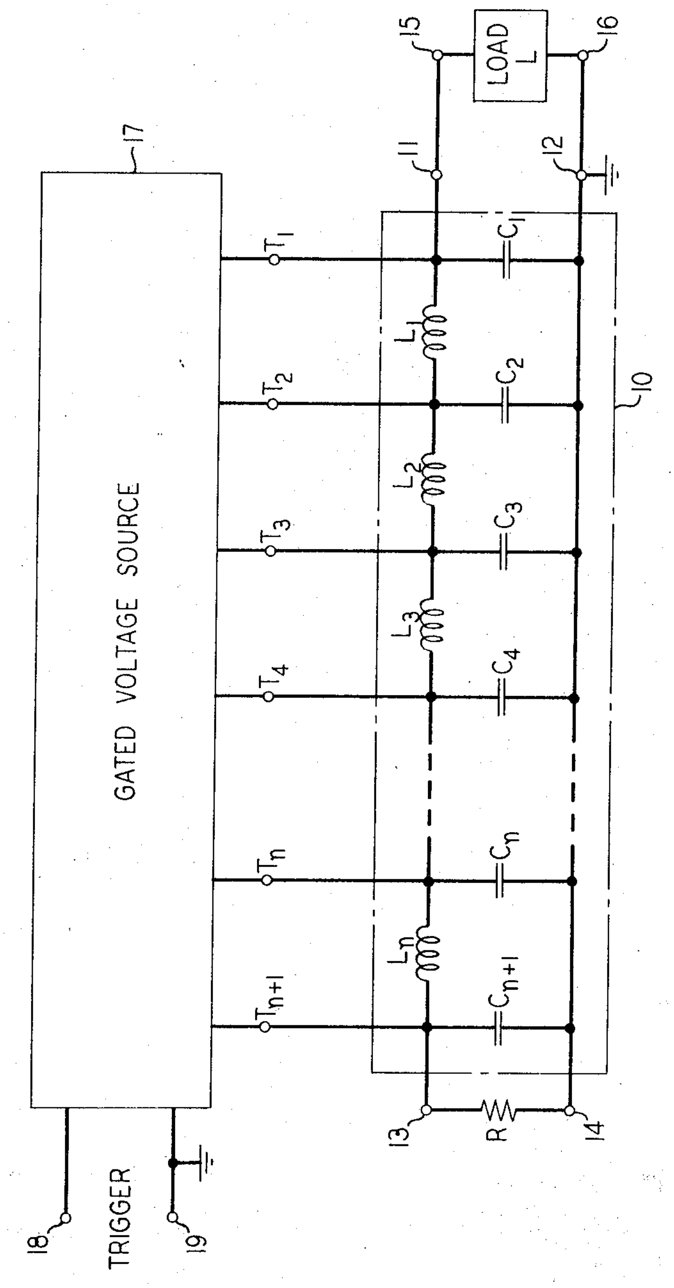
FIG. 1 is a combination schematic-block diagram of one embodiment of the invention.

The disclosed embodiment of FIG. 1 includes a two-port network comprising a constant-K, low-pass filter-type delay line 10 with output port terminals 11 and 12 and input port terminals 13 and 14. In particular, line 10 comprises a plurality of serially connected inductors $L_1$ through $L_n$ and shunt-connected capacitors $C_1$ through $C_{n+1}$. One terminal of each of these capacitors is connected to a point of ground potential by way of a ground connection to terminal 12.

The values of the inductors and capacitors of line 10 are chosen to meet two conditions. First, when progressing from input port terminals 13 and 14 to output port terminals 11 and 12, the propagation velocities of the sections of line 10 get progressively smaller or, stated in another form, the time delays of the sections get progressively larger. The line, therefore, is incrementally time dispersive. Secondly, when looking from input port terminals 13 and 14 toward output port terminals 11 and 12, the characteristic impedance remains the same from section to section. Techniques useful for designing lines meeting these conditions are well known to those skilled in the art as exemplified by "Appendix C" of *Pulse, Digital, and Switching Waveforms* by J. Millman and H. Taub (McGraw-Hill, 1965).

Output port terminals 11 and 12 are connected to a pair of output terminals 15 and 16, respectively. A load L is connected between output terminals 15 and 16. This load has an impedance equal to that of the line when progressing from input port terminals 13 and 14 to output port terminals 11 and 12; in other words, the load impedance matches that of the line whereby reflections are not produced.

A resistor R is connected between input port terminals 13 and 14. This resistor has a value which matches the impedance of the line whereby reflections are not produced.

Figure 2:
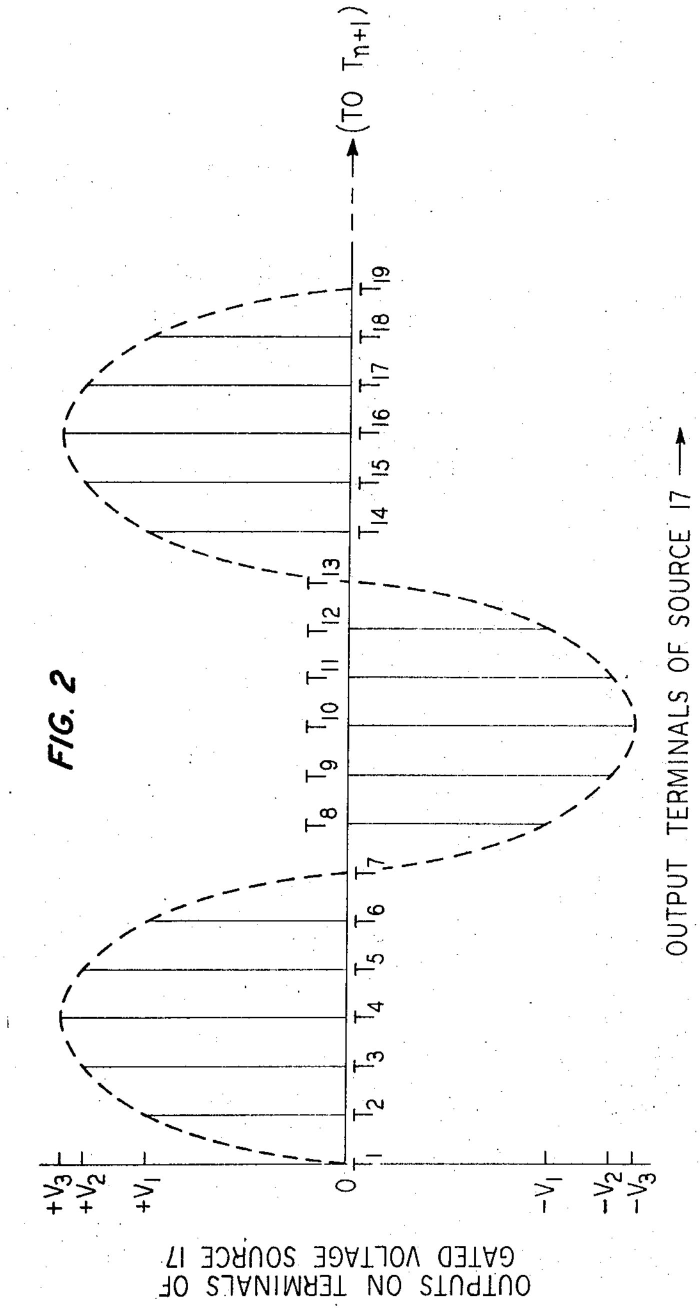
FIG. 2 is a graph showing voltage levels appearing at indicated points in the embodiment of FIG. 1.

The embodiment of FIG. 1 also includes a gated source 17. This source has output terminals $T_1$ through $T_{n+l}$ and a set of input terminals 18 and 19. When a trigger pulse is applied to input terminals 18 and 19, source 17 is enabled and produces direct current voltages on its output terminals. The levels of these voltages, when the source is not subjected to any current drain, is shown in FIG. 2. It should be noted that these voltages are of seven basic levels namely, $+V_3$, $+V_2$, $+V_1$, 0, $-V_1$, $-V_2$ and $-V_3$ and that these levels, when viewed in a terminal-dispersed manner as shown in FIG. 2, have a sinusoidal envelope.

Figure 3:
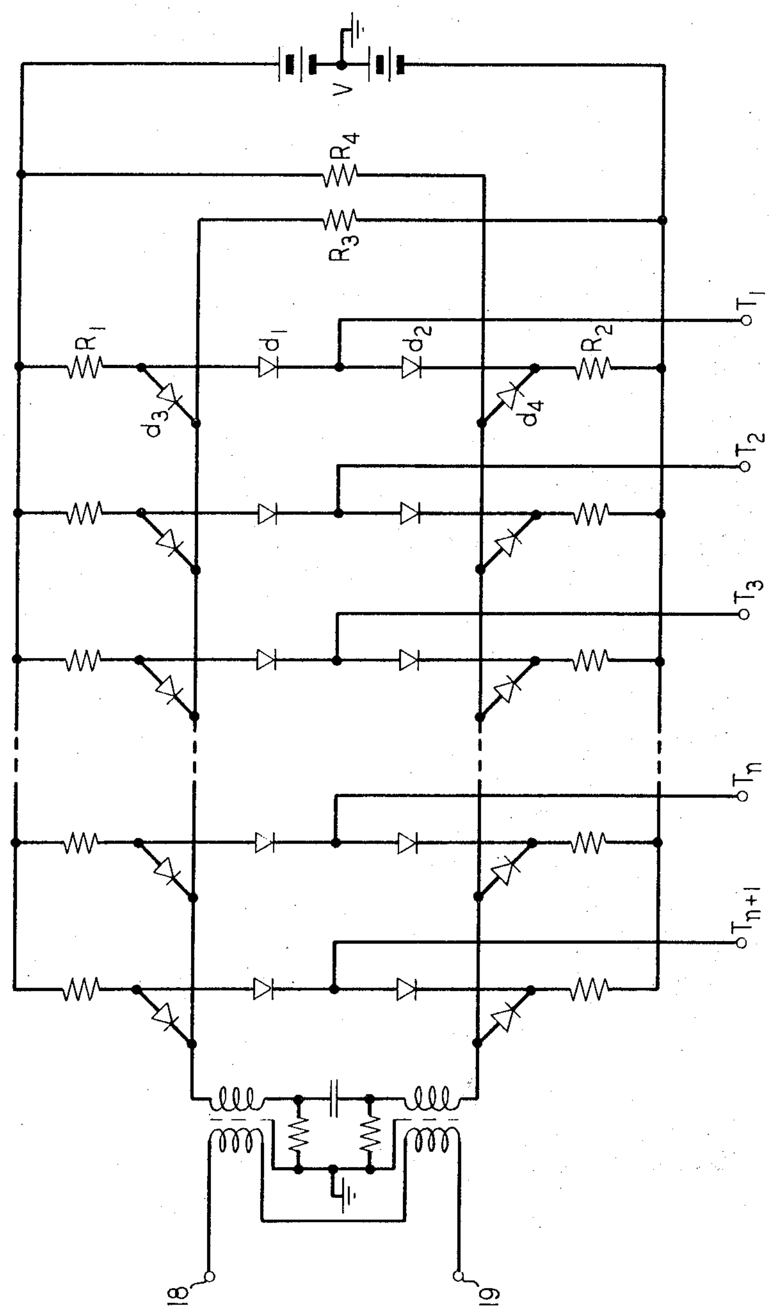
FIG. 3 is a schematic diagram of a gated voltage source which may be used in the embodiment of FIG. 1.

A schematic diagram of a circuit which may be used as source 17 is shown in FIG. 3. In brief, this circuit comprises a plurality of normally reversed biased voltage dividers. The first of these dividers comprises a resistor $R_1$, diodes $d_1$ and $d_2$ and a resistor $R_2$ connected in series in that order across a direct current voltage supply V. Output terminal $T_1$ is connected to the junction between the diodes. The desired output voltage level and polarity is determined by the values of resistors $R_1$ and $R_2$.

Diodes $d_1$ and $d_2$ are normally reverse biased by a pair of diodes $d_3$ and $d_4$ connected to source V by way of resistors $R_3$ and $R_4$, respectively. In particular, current normally flows from source V, through resistor $R_4$, diode $d_4$ and resistor $R_2$ back to source V. By the voltage dividing action between resistors $R_2$ and $R_4$, a positive potential is applied to the cathode of diode $d_1$. In a similar manner, resistors $R_1$ and $R_3$ and diode $d_3$ apply a negative potential to the anode of diode $d_1$. These potentials reverse biased diodes $d_1$ and $d_2$, thus not applying any potential to terminal $T_1$. When a pulse is applied to terminals 18 and 19, diodes $d_3$ and $d_4$ are reversed biased, diodes $d_1$ and $d_2$ are forward biased and a potential appears at terminal $T_1$. The remaining dividers operate in the same manner.

Referring back to FIG. 1, terminals $T_1$ through $T_{n+2}$ are connected to the ungrounded terminals of capacitors $C_1$ through $C_{n+1}$, respectively. When therefore, a trigger pulse is applied to source 17, the source is enabled and voltages are applied to the capacitors. The source is enabled for a period of time sufficient to permit the capacitors to become substantially fully charged, whereby the voltages across them will have levels substantially as shown in FIG. 2. On the other hand, this period of time is not permitted to extend any more than necessary so that energy stored in the inductors is kept to a minimum.

Figure 4:
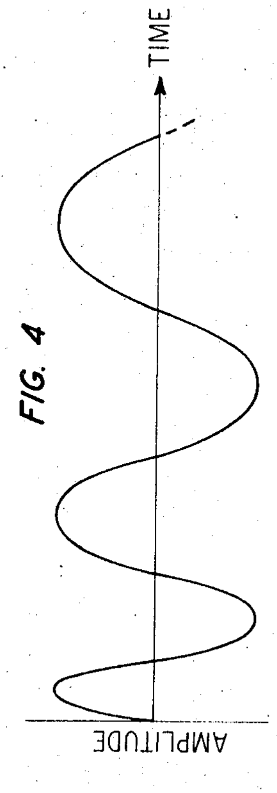
FIGS. 4 and 5 are graphs of waves appearing in the embodiment of FIG. 1.
Figure 5:
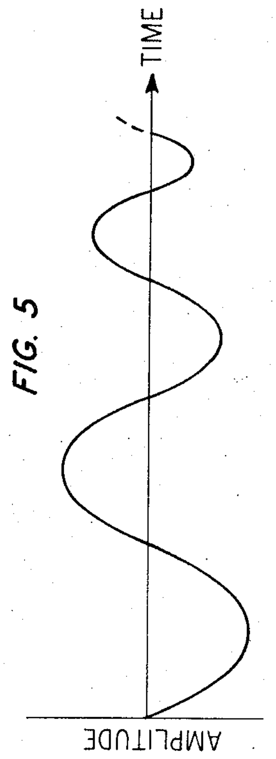

When source 17 again becomes disabled, capacitors $C_1$ through $C_{n+l}$ have energy stored within them. In this manner, a pseudo sine wave voltage is impressed on line 10 which produces forward and backward travelling waves as the capacitors begin to discharge. As mentioned earlier, the propagation constant of line 10 gets smaller when progressing from terminals 13 and 14 to terminals 11 and 12. The waves therefore travel at different velocities at different points within the line, whereby the waves appearing across resistor R and load L are frequency modulated in opposite senses as shown in the waveforms of FIGS. 4 and 5. The wave across load L has a substantially constant amplitude because of the substantially constant impedance characteristic when viewing from input port to output port. The decreasing amplitude of the wave across resistor R, on the other hand, is produced by the nonconstant impedance characteristic of the line when viewing in the opposite direction.

Several things should be noted. First, the forward and backward traveling waves are substantially absorbed by resistor R and load L, thus keeping to a minimum reflections which otherwise would adversely affect the shape of the Chirp output across load L. Secondly, the line may be designed to have its propagation constant change in the opposite sense to produce an increasing frequency burst output across load L.

Figure 6:
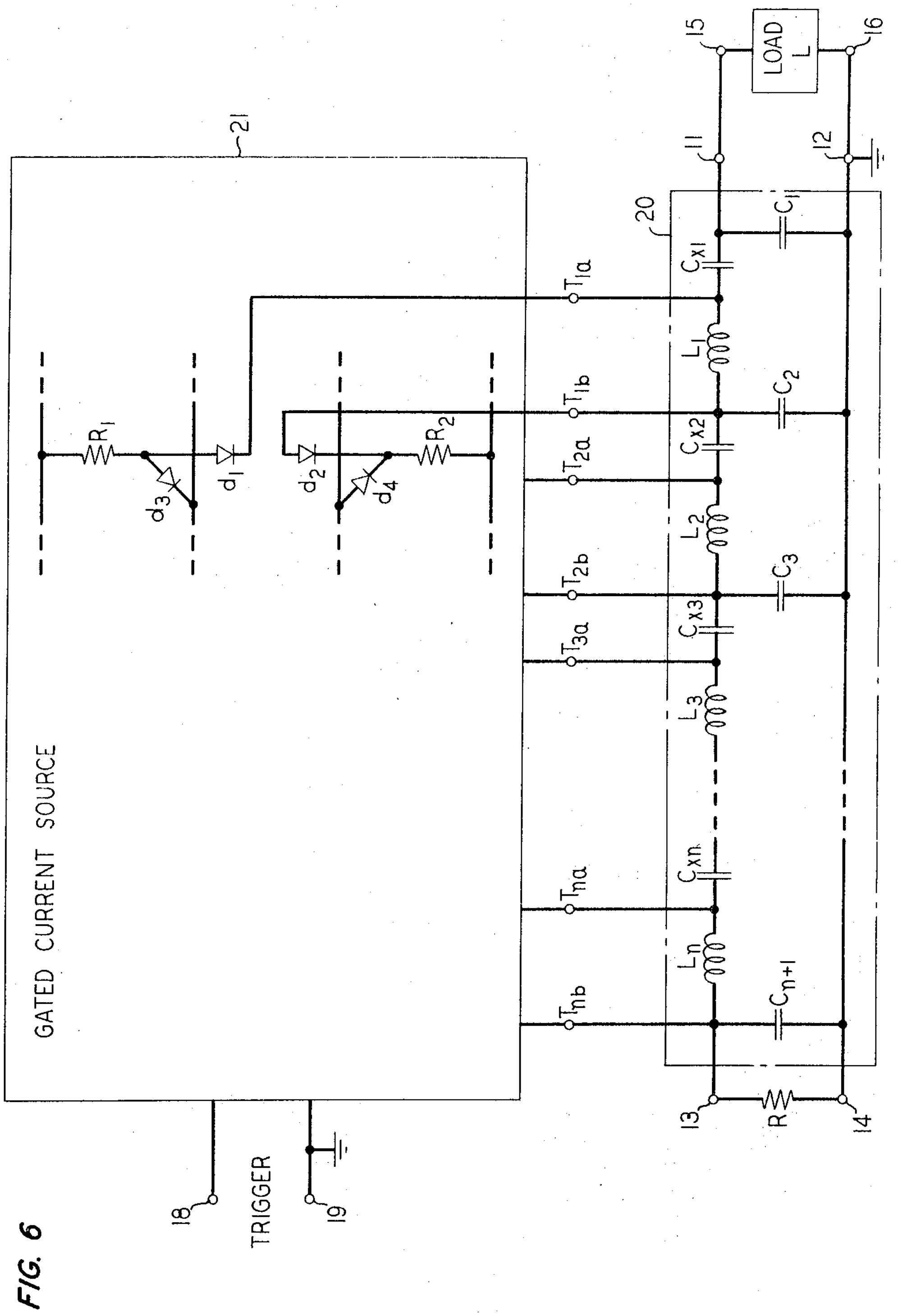
FIG. 6 is a combination schematic-block diagram of another embodiment of the invention.

Another embodiment of the invention is disclosed in FIG. 6. This embodiment includes a delay line 20 having all of the elements of line 10 of the embodiment of FIG. 1. Each inductor of line 20 has, however, a very large capacitor in series connection with it. These capacitors, which are identified as $C_{xl}$ through $C_{xn}$, have sufficiently large values so that they, relatively speaking, have negligible impedance in the passband required to generate the Chirp pulse, whereby line 20 exhibits substantially the same characteristics as line 11 in this passband. The sole purpose of these capacitors is to provide direct current isolation between the inductors without interfering with the discharging of the line to produce the Chirp output.

As in the earlier described embodiment, an impedance matching resistor R is connected across the input port of line 20. Similarly, an impedance matching load L is connected between output terminals 15 and 16 which are, in turn, connected to output port terminals 11 and 12.

A gated current source 21 is connected to the inductors of line 20 so that when enabled, currents of predetermined polarities and magnitudes build up in the inductors. A graph showing these currents would have the same configuration as the voltage graph shown in FIG. 3. Source 21 may have the same configuration as the gated voltage source shown in FIG. 3 with the exception that the paths between the diodes in the voltage dividers are broken for the insertion of respective inductors. This is shown for one stage in FIG. 6 where the ends of the broken path are brought out to a set of terminals $T_{la}$ and $T_{2a}$ which, in turn, are connected to inductor $L_1$. The values of resistors $R_1$ and $R_2$ are of course selected for the desired maximum current while the order in which terminals $T_{la}$ and $T_{lb}$ are connected to inductor $L_1$ is selected to provide the desired polarity of the current in the inductor. It should be noted that the inductors are charged independently of one another because of the direct current isolation provided by the capacitors.

When the inductors have been charged and source 21 is again disabled, forward and backward traveling waves are produced and travel to and are absorbed by load L and resistor R, respectively. The waves received by load L and resistor R are the same as those shown in FIGS. 4 and 5, respectively.

It should be noted that although the two embodiments have been described as having constant delay differences from section to section of the lines, these delay differences need not be constant. They should, however, change in the same direction; i.e., the delay differences should get progressively smaller or larger. Nonconstant delay time differences produce nonlinearly Chirped outputs. Such outputs are desireable when the time delay network in a Chirp receiver has a nonlinear frequency response.

Various advantages provided by the invention are believed readily apparent from the disclosed embodiments. First, the use of only passive components produces high degrees of reliability and stability. Second, the use of only passive components and, furthermore, a simple centertapped power supply results in embodiments which are less expensive to produce than known Chirp generators. Finally, the configurations of the embodiments result in several advantages. For example, there is excellent isolation between trigger inputs and Chirp outputs. Furthermore, the embodiments also have low sensitivity to the shape of the trigger pulse, while the shape of the Chirp output may be readily modified by changing the values of the inductors and capacitors of the lines. Still further, a relatively fast recovery time is provided because recovery time is dependent only on the time to charge the line.

What is claimed is:

1. A Chirp pulse generating circuit comprising a constant-K, low-pass filter-type delay line comprising serially connected inductor and shunt-connected capacitor elements and, furthermore, having input and output ports, said inductor and capacitor elements having values to provide said line, when viewed from said input port to said output port, with a substantially constant impedance characteristic and a progressively changing time delay characteristic, a gated energy source connected to all of said elements of one type to charge those elements, when said source is enabled, to energy levels which levels when viewed as dispersed on said line have a sine wave envelope, an impedance matching resistor connected across said input port, and an impedance matching load connected across said output port.

2. A circuit in accordance with claim 1 in which said source is a voltage source having output leads connected to said delay line capacitive elements, respectively.

3. A circuit in accordance with claim 2 in which the difference in time delay from section to section of said line is a constant.

4. A circuit in accordance with claim 1 wherein each of said inductor elements in said delay line has a relatively large valued capacitor connected in series with it, said large valued capacitors having a negligible effect within the passband of said delay line.

5. A circuit in accordance with claim 4 in which said source is a current source having sets of output leads connected to said delay line inductor elements, respectively.

6. A circuit in accordance with claim 5 in which the difference in time delay from section to section of said line is a constant.

7. A circuit for generating Chirp pulses, said circuit comprising a two-port low-pass filter-type delay line comprising inductor and capacitor elements and, furthermore, having a constant-K characteristic in a passband at least equal to the bandwidth of said Chirp pulses, said inductor and capacitor elements having values to provide said line, when viewed from a first of said ports to the other of said ports, with a substantially constant impedance characteristic and a progressively changing time delay characteristic, a gated energy source connected to all of said elements of one type to charge those elements, when said source is enabled, to energy levels which levels when viewed as dispersed on said line have a sine wave envelope, an impedance matching resistor connected across said first port, and an impedance matching load connected across said other port.

8. A circuit in accordance with claim 7 in which said source is a voltage source having output leads connected to said delay line capacitive elements, respectively.

9. A circuit in accordance with claim 8 in which the difference in time delay from section to section of said line is a constant.

10. A circuit in accordance with claim 7 wherein each of said inductor elements in said delay line has a relatively large valued capacitor connected in series with it, said large valued capacitors having a negligible effect within the passband of said delay line.

11. A circuit in accordance with claim 10 in which said source is a current source having sets of output leads connected to said delay line inductor elements, respectively.

12. A circuit in accordance with claim 11 in which the difference in time delay from section to section of said line is a constant.

13. A Chirp pulse generating circuit comprising an incrementally time dispersive delay line comprising inductor and capacitor elements and, furthermore, having input and output ports, a gated energy source connected to all of said elements of one type to charge those elements, when said source is enabled, to energy levels which levels when viewed as dispersed on said line have a sine wave envelope, an impedance matching resistor connected across said input port, and an impedance matching load connected across said output port.

14. A circuit in accordance with claim 13 in which said source is a voltage source having output leads connected to said delay line capacitive elements, respectively.

15. A circuit in accordance with claim 14 in which the difference in time delay from section to section of said line is a constant.

16. A circuit in accordance with claim 13 wherein each of said inductor elements in said delay line has a relatively large valued capacitor connected in series with it, said large valued capacitors having a negligible effect within the passband of said delay line.

17. A circuit in accordance with claim 16 in which said source is a current source having sets of output leads connected to said delay line inductor elements, respectively.

18. A circuit in accordance with claim 16 in which the difference in time delay from section to section of said line is a constant.

* * * * *